(12) United States Patent
Paulino et al.

(10) Patent No.: US 8,474,057 B2
(45) Date of Patent: Jun. 25, 2013

(54) LICENSE RECONCILIATION FOR ONLINE SERVICES

(75) Inventors: Roderick Carlos Paulino, Renton, WA (US); Vikas Ahuja, Sammamish, WA (US); Jodene L. Eikenberry, Shoreline, WA (US); Dawn Marie Kister, Seattle, WA (US); Alexander Semko, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 13/022,531

(22) Filed: Feb. 7, 2011

(65) Prior Publication Data

US 2012/0204270 A1    Aug. 9, 2012

(51) Int. Cl.
*G06F 7/04* (2006.01)
*H04N 7/16* (2006.01)

(52) U.S. Cl.
USPC ............... 726/30; 717/120; 717/168

(58) Field of Classification Search
USPC ............ 717/120, 168; 713/177; 726/26, 726/30
See application file for complete search history.

(56) References Cited

U.S. PATENT DOCUMENTS

| | | | | |
|---|---|---|---|---|
| 6,056,786 A * | 5/2000 | Rivera et al. | | 717/168 |
| 8,166,257 B1 * | 4/2012 | Holl et al. | | 711/154 |
| 8,321,948 B2 * | 11/2012 | Robinson et al. | | 726/26 |
| 2001/0011253 A1 | 8/2001 | Coley et al. | | |
| 2004/0039594 A1 * | 2/2004 | Narasimhan et al. | | 705/1 |
| 2004/0039916 A1 * | 2/2004 | Aldis et al. | | 713/177 |
| 2005/0289072 A1 | 12/2005 | Sabharwal | | |
| 2008/0114695 A1 | 5/2008 | Gutierrez | | |
| 2009/0031286 A1 * | 1/2009 | Yee et al. | | 717/120 |
| 2009/0119779 A1 | 5/2009 | Dean et al. | | |
| 2009/0158438 A1 * | 6/2009 | Pichetti et al. | | 726/26 |
| 2009/0327498 A1 * | 12/2009 | Sampath et al. | | 709/228 |

OTHER PUBLICATIONS

Engagent Inc, Engagent Software License Manager, Sep. 12, 2009.*
Software Defender 2.1, Pub. Date: Jul. 14, 2007, (1 page).
Software_DNA, www.softworks.com/DNAinnovation/ Retrieved Date: Dec. 10, 2010 (1 page).
Avangate—Product License Management, Retrieved Date: Dec. 10, 2010 (2 pages).

* cited by examiner

*Primary Examiner* — Dustin Nguyen
(74) *Attorney, Agent, or Firm* — Workman Nydegger

(57) ABSTRACT

A user interface that allows for efficient resolution of license conflicts. The user interface includes a license conflict discovery mechanism that automatically discovers whether a license conflict exists for a license. Upon determining a subset of available resolution methods that are suitable for the administrator right corresponding to the user of the user interface, the user interface provides a resolution prompt. The resolution prompt prompts the user of the user interface to resolve the license conflict using any one of the available subset of resolution methods. The types of the offered resolution methods offered by the user interface differ according to the administration rights of the user.

20 Claims, 11 Drawing Sheets licenses

| Subscriptions | Available | Assigned | Status |
|---|---|---|---|
| Union Standard | 10 licenses | 18 licenses | ⊗ 8 users need valid licenses. Resolve now |
| Exchange Online Standard | 10 licenses | 0 licenses | ⊙ No licenses are assigned. Assign now |
| SharePoint Online Standard | 0 licenses | 10 licenses | ⊗ Your subscription has expired. Contact Support |
| Union Deskless Worker | 5 licenses | 5 licenses | |

*Figure 4* licenses

| Subscriptions | Available | Assigned | Status |
|---|---|---|---|
| Union Standard<br>Suite includes Outlook, Sharepoint, Communicator and Office Subscription | 10 licenses | 10 licenses | |
| Exchange Online Standard<br>Suite includes this, that and the other funny looking thingy | 10 licenses | 0 licenses | ⓘ No licenses are assigned. Assign now |
| SharePoint Online Standard<br>Suite includes this, that and the other funny looking thingy | 0 licenses | 10 licenses | ⊗ Your subscription has expired. Contact Support |
| Union Deskless Worker<br>Suite includes this, that and the other funny looking thingy | 5 licenses | 5 licenses | |

LICENSE RECONCILIATION FOR ONLINE SERVICES

BACKGROUND

A variety of services are offered over a network. In some cases, the location of the services is abstracted away from the service consumer. This is often termed a service in the cloud or "online service". The online service may be partially offered over the Internet and/or some other network, or perhaps even some of the service may be enabled through local means.

In some cases, it is necessary to obtain a license in order to use an online service. The license is provided by the owner of the service (the licensor) to the consumer of the service (the licensee). The licenses may be single-user licenses, or multi-user licenses. The license thus has a certain scope in terms of number of users. The license may also have a scope in term of which online services may be consumed.

The needs of a licensee are rarely static when it comes to online services. For instance, the licensee may need to license additional users, or perhaps license additional online services. In these cases, the licensee would make provisions with the licensor to alter the scope of the license.

BRIEF SUMMARY

At least one embodiment described herein relates to a user interface that allows for efficient resolution of license conflicts. The user interface includes a license conflict discovery mechanism that automatically discovers whether a license conflict exists for a license. Upon determining a subset of available resolution methods that are suitable for the administrator right corresponding to the user of the user interface, the user interface provides a resolution prompt. The resolution prompt prompts the user of the user interface to resolve the license conflict using any one of the available subset of resolution methods.

The types of the offered resolution methods offered by the user interface differ according to the administration rights of the user. For instance, if the user has purchasing rights, the user may be able to purchase additional users for the license as a mechanism to resolve the conflict. If the user has IT rights, the user may be able to remove certain users from having accessing to the online service in order to resolve the license conflict. A general administrator may have more universal rights to resolve the license conflict in any available way.

Thus, the principles described herein provide an efficient mechanism to notify an administrator that there is a license conflict for online services, and provide mechanisms for resolving the conflict in a manner that is suitable given the administrative rights of the individual interfacing with the user interface.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 4 illustrates an example license overview window that may appear should the administer select the resolve link in the administrator overview window of FIG. 3;

FIG. 11 illustrates a license overview window that is similar to the license overview window of FIG. 4, except that one of the licensing conflicts of FIG. 4 is shown resolved in FIG. 11.

DETAILED DESCRIPTION

In accordance with embodiments described herein, a user interface allows for efficient resolution of license conflicts for online services. The user interface includes a license conflict discovery mechanism that automatically discovers whether a license conflict exists for a license. Upon determining a subset of available resolution methods that are suitable for the administrator right corresponding to the user of the user interface, the user interface provides a resolution prompt. The resolution prompt prompts the user of the user interface to resolve the license conflict using any one of the available subset of resolution methods. The types of the offered resolution methods offered by the user interface differ according to the administration rights of the user. First, some introductory discussion regarding computing systems will be described with respect to FIG. 1. Then, the embodiments of the licensing resolution will be described with respect to FIGS. 2 through 11.

Figure 1:
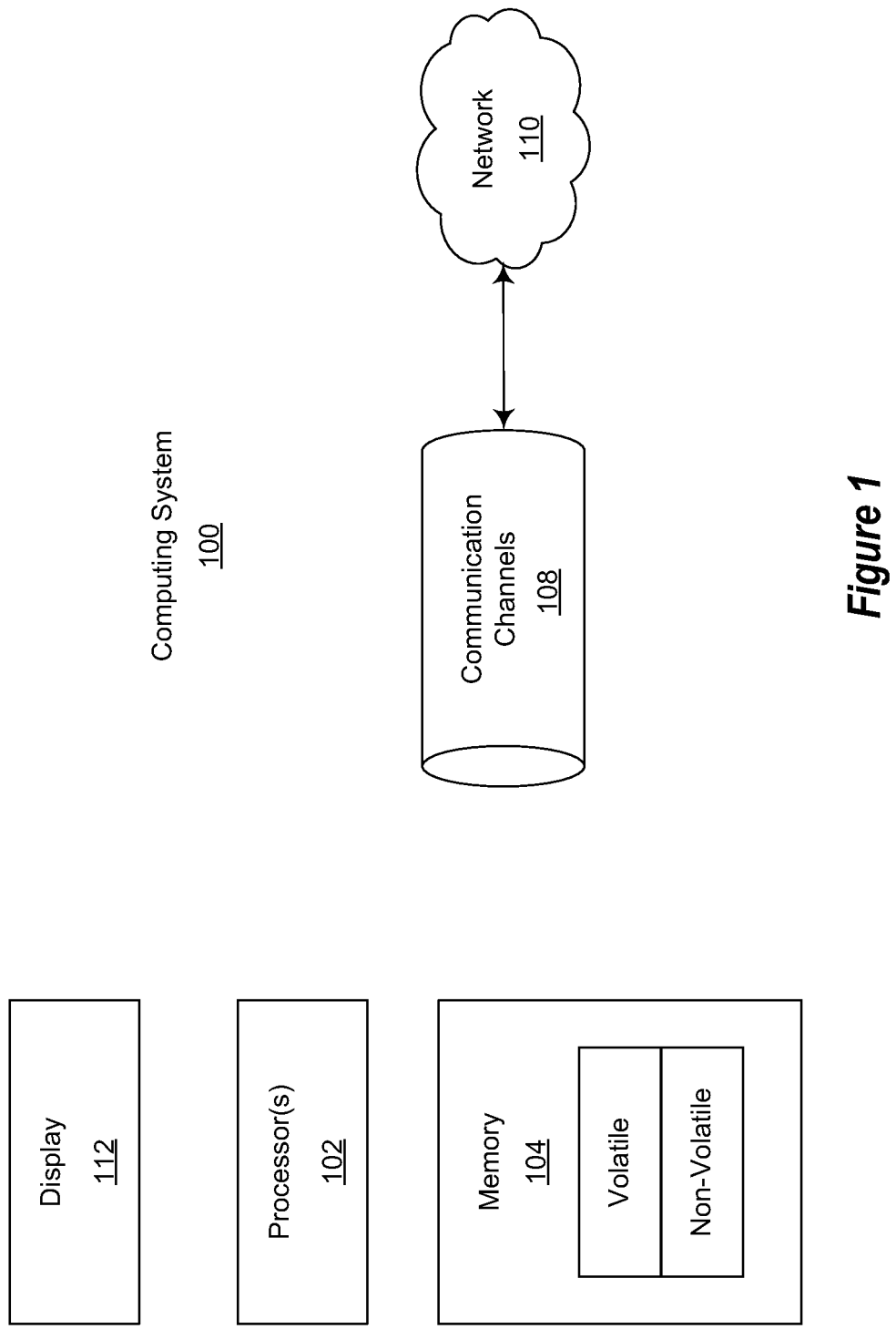
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems. As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. The computing system may also include a display 112 that may display one or more user interfaces that a user of the computing system may interface with.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
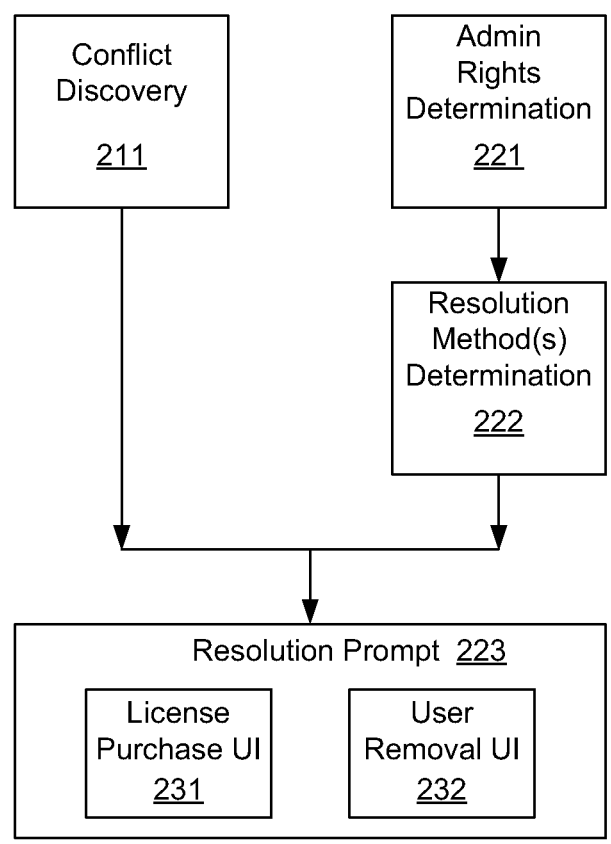
FIG. 2 abstractly illustrates a user interface that may be displayed on a computing system.

FIG. 2 abstractly illustrates a user interface 200 that may be displayed on a computing system. For instance, the computing system 100 of FIG. 1 may display the user interface on the display 112. In one embodiment, the computing system formulates the user interface 200 by one or more processors of the computing system executing computer-executable instructions that are structured so their execution causes the formulation of the user interface 200.

The user interface 200 includes a license conflict discovery mechanism 211 for automatically discovering whether a license conflict exists for a license. In one embodiment, the license conflict discovery mechanism 211 is capable of detecting multiple types of license conflicts. As an example, one type of license conflict might be a "license exceeded" conflict in which the licensee has exceed the scope of the license. For instance, perhaps the licensee is licensed for only 10 users on a particular online service, but the licensee has assigned 18 users to the particular online service. Another type of license conflict is an underutilization conflict in which the licensee is able to assign more users to use a particular online service. This situation is technically not a strict conflict since the licensee is acting within the scope of the contract. Nevertheless, in this description and in the claims, this situation is also included within the scope of license conflict.

For at least one of the types of license conflicts, there are multiple methods available for resolving the conflict. In accordance with the principles described herein, the user interface 200 only facilitates those method(s) that are suitable for the rights of the administrator that is interfacing with the user interface 200. An administrator rights determination mechanism 221 is configured to discover an administrator right of a user (i.e., an administrator) of the user interface 200). The resolution method determination mechanism 222 is configured to determine a subset of available resolution methods that are suitable for the administrator right determined by the administrator rights determination mechanism. A resolution prompt mechanism 223 is configured to prompt the administer interfacing with the user interface to resolve the license conflict by performing one of the subset of available resolution methods determined by the resolution method determination mechanism 222.

For instance, suppose that the license conflict is a license exceeded conflict. Now suppose that, in general, that conflict may be resolved in any one or two possible methods 1) a license purchase method that may be used to purchase additional users on the license, and 2) a user removal method that may be used to remove users off the online service corresponding to the license. For instance, in the case in which the licensee has assigned 18 users to an online service for which only 10 users are licensed, the conflict may be resolved by either purchasing additional user capacity under the license, or by removing users from having access to the online service. Referring to FIG. 2, the resolution prompt mechanism 223 includes a license purchase user interface 231 that may be interact with the perform a license purchase, and a user removal user interface 232 that may be interacted with to remove users from the online service.

In accordance with the principles described herein, the subset of resolution methods may differ depending on the rights of the administrator. For instance, a global administrator may have the right to purchase new licenses (using the user interface 231) and to remove users from the online service (using the user interface). However, a purchasing administrator may have the right to purchase new licenses (using the user interface 231), but may not have the right to remove users from the online service. A password administrator or an IT administrator may have the right to remove users from the online service (using the user interface 232), but may not have the right to purchase new licenses.

Figure 3:
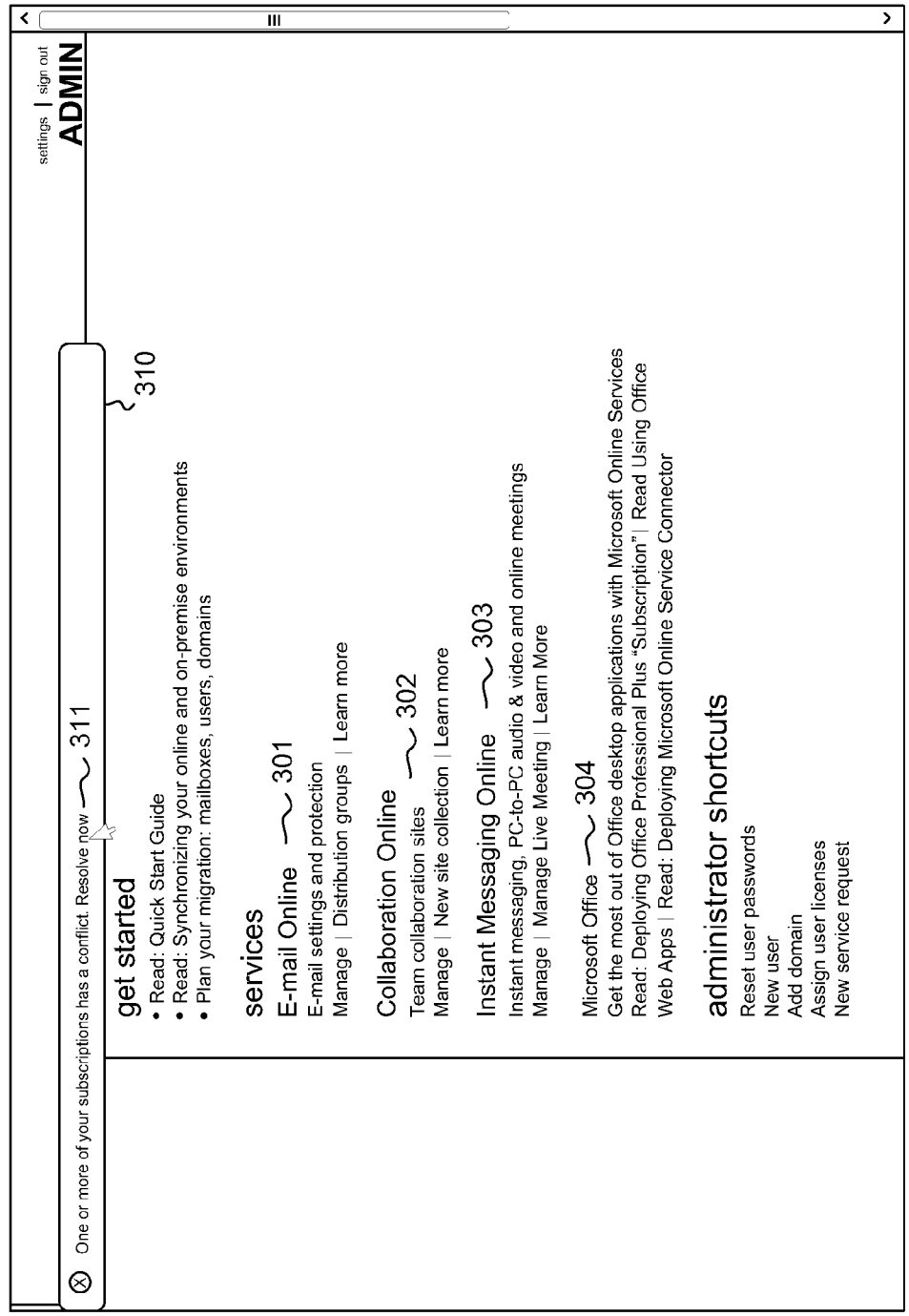
FIG. 3 illustrates an administrator overview window that may be displayed to an administrator in order to help the administrator manage a number of online services.

A specific example of a user interface 200 will now be described with respect to FIGS. 3 through 11. FIG. 3 illustrates an administrator overview window 300 that may be displayed to an administrator in order to help the administrator manage a number of online services. The window 300 includes a number of helpful tools for an administrator including the ability to manage a number of online services 301, 302, 303 and 304. The computing system has also detected a license conflict (reference act 211 of FIG. 2). In some cases, the conflict is severe enough to warrant a notification in the administrator overview window 300. In this case, the notification window 310 appears, which includes a resolve link 311 that the administrator may select to resolve the issue. In one embodiment, a license exceeded conflict will result in a notification at the administrator overview window 300, whereas a license underutilization conflict will not.

FIG. 4 illustrates an example license overview window 400 that may appear should the administer select the resolve link in the administrator overview window 300 of FIG. 3. Here, there are four different licenses. The Subscription column 401 identifies the online service, the Available column 402 identifies the available licenses for the corresponding online service, the Assigned column 403 identifies the number of licenses assigned for the corresponding online service, and the Status column 404 gives the license status.

Row 411 corresponds to an online service called Union Standard. In this case, there are 10 licenses available, but actually 18 assigned users for this online service. This represents a severe conflict since the scope of the license has actually been exceeded. The severe nature of this conflict is represented by the X icon 405A in the Status column 404. A conflict message 405B is also provided describing the nature of the conflict (in this case, since there are only 10 licenses available, and 18 users are assigned to the online service, 8 users need valid licenses). A resolve link 405C is provided to allow the administrator to resolve this particular license conflict.

Row 412 corresponds to an online service called Exchange Online Standard. For this service, there are 10 licenses available, but zero assigned users for this online service. This is not a severe conflict, since the licensee is still well within the scope of the license. The nature of this conflict is represented by the information icon 406A in the Status column 404. A conflict message 406B is also provided describing the nature of the conflict (in this case, no licenses have been assigned). A resolve link 406C is provided to allow the administrator to resolve this particular license conflict by assigning users to the online service.

Row 413 corresponds to an online service called Sharepoint Online Standard. In this case, there are 0 licenses available since the license has actually expired. There are 10 assigned users for this online service. This represents a severe conflict since the scope of the license has actually been exceeded. The severe nature of this conflict is represented by the X icon 407A in the Status column 404. A conflict message 407B is also provided describing the nature of the conflict (in this case, that the license has expired). A resolve link 407C is provided to allow the administrator to resolve this particular license conflict.

Note that the resolve link 405C allows the administrator to directly resolve the license conflict, whereas the resolve link 407C has the administrator contact another department for resolution. This is because the computing system has determined the administrative rights of the administrator (reference act 221 of FIG. 2) and identified that the administrator may edit the users on an online service (and thus there is at least one way for the administrator to resolve the license exceeded conflict of row 411), but may not purchase a license (and thus there is no way for the administrator to resolve the license expired conflict of row 413). However, the administrator certainly does have authority to contact support to request their help to resolve the conflict. Thus, the license review window 400 identifies all licenses, and identifies where the license conflicts are. The license review window 400 further gives the administrator links to resolve the license conflicts as far as the administrator has rights to resolve the license conflicts.

In row 414, there is no license conflict for the Union Desktop Worker service since there are exactly the same users assigned to the service as there are licenses available.

Figure 5:
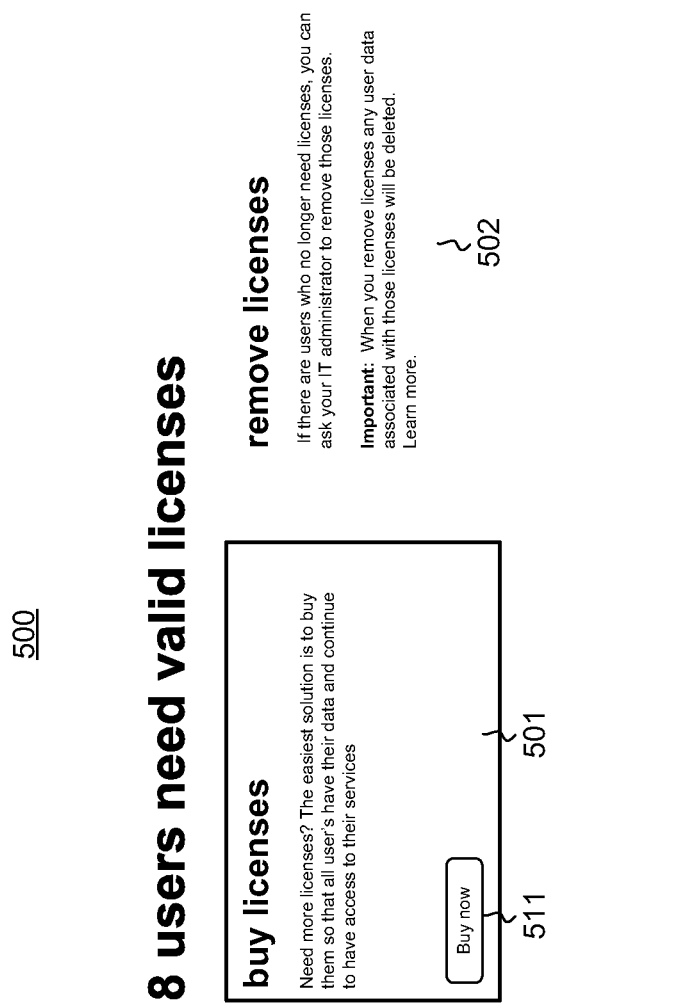
FIG. 5 illustrates a buy licenses window that may appear to help an administrator resolve a license exceeded conflict had the administrator had rights to buy licenses, but no rights to remove users from an online service.

FIG. 5 illustrates a buy licenses window 500 that may be used by an administrator who does have authority to buy licenses, but not remove users from an online service. The buy licenses window 500 has an active "buy licenses" portion 501 (on the left) in which there is a control 511 that may be selected by the administrator to resolve the license exceeded conflict by purchasing additional licenses. The buy license window 500 also has a passive "remove users" portion 502 (on the right) in which there are no controls provided. If the administrator had authority to remove users from an online service, the "remove users" portion 502 would have also been active. The passive portion 502 is illustrated in deemphasized form to convey to the administrator that while the administrator cannot resolve the license conflict using the right portion 502 by removing users from the online service, it could perhaps be resolved in that manner by others having proper rights.

Note that the buy licenses window 500 will not appear when the administrator selects the resolve link 405C in FIG. 4. This is because the administrator in FIG. 4 has the rights to remove users from an online service, but does not have any rights to buy licenses. This is opposite to the situation in FIG. 5, which represents a window that would appear had the administrator had rights to purchase licenses, but did not have the right to remove users from the online service. Rather, if the administrator were to select the resolve link 405C in FIG. 4, the "remove users" window 600 of FIG. 6 might appear.

The remove users window 600 has a passive "buy licenses" portion 601 (on the left). Had the administrator had authority to buy licenses, the "buy licenses" portion 601 would have been active and have a control for purchasing licenses. The remove users window 600 has an active "remove users" portion 602 that has a control 612 that may be selected by the administrator in order to remove users.

Figure 7:
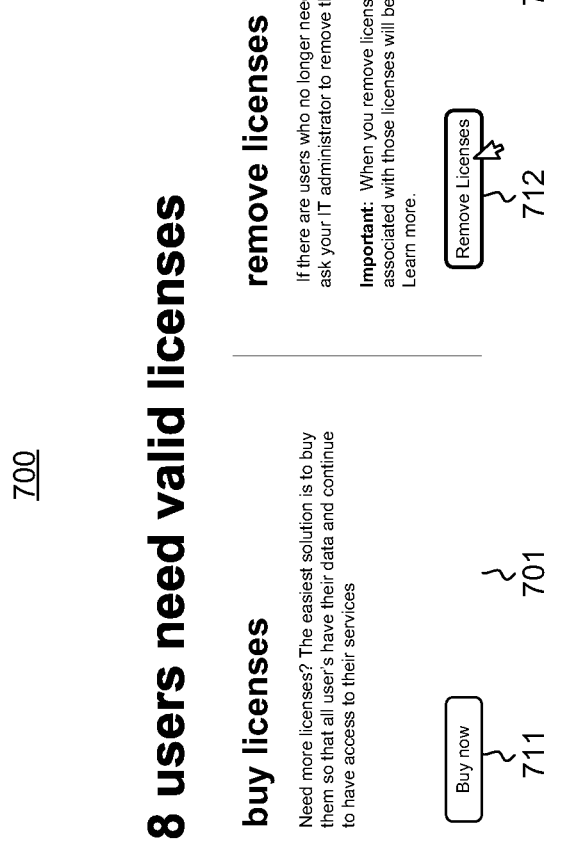
FIG. 7 illustrates a global resolution window in which there is a "buy licenses" portion on the left that has a control, and a "remove users" portion on the right that also has a control.

For completeness, FIG. 7 illustrates a global resolution window 700 in which there is a "buy licenses" portion 701 (on the left) that has a control 711, and a "remove users" portion 702 (on the right) that has a control 712. Both portions are active. As such, this represents a window 700 that might appear to an administrator upon selecting the link 405C of FIG. 4 had the administrator had more global administrative rights. Note how the user interface takes into consideration the rights of the administrator in presenting options for resolving license conflicts.

Figure 6:
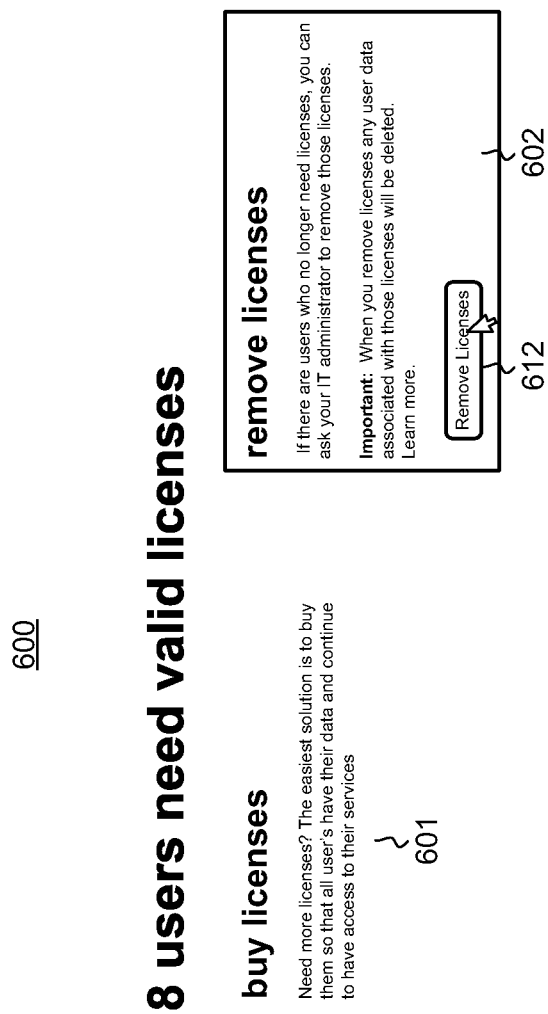
FIG. 6 illustrates a remove users window that may appear to help an administrator resolve a license exceeded conflict had the administrator had rights to remove users from an online service, but no rights to purchase licenses.
Figure 8:
FIG. 8 illustrates a user interface that permits an administrator to select specific users for removal from an online service, the window appearing if the administrator selects the remove users control of FIG. 6.
Figure 9:
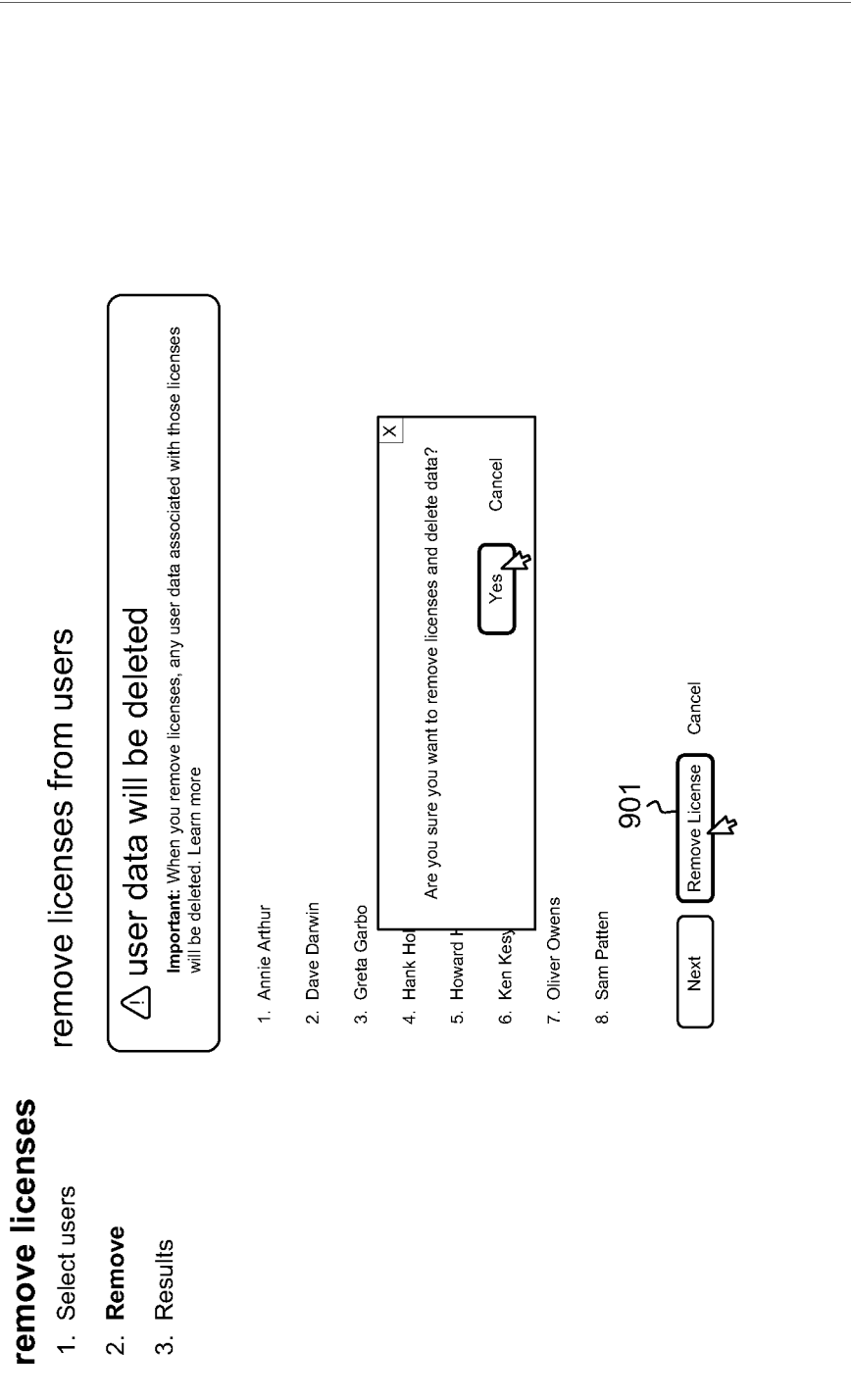
FIG. 9 illustrates a removal confirmation window that may appear giving the administrator a summary of those that will be removed from the online service upon selecting the "Remove Licenses" control.

FIG. 8 illustrates a user interface 800 that may appear had the administrator of FIG. 6 selected the remove licenses control 612 of FIG. 6. The same window would appear had a global administrator of FIG. 7 selected the remove licenses control 712 of FIG. 7. The user interface 800 includes a selection window 801 that allows the administrator to select users for removal from the online service. The user interface 800 also includes a current removed status portion 802 showing those currently selected for removal.

Figure 10:
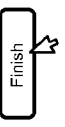
FIG. 10 illustrates a removal confirmation window that may appear should the user select the "Remove Licenses" control of FIG. 9 and confirms removal of the selected users in FIG. 9.

Upon selecting control 803, a removal confirmation window 900 may appear giving the administrator a summary of those that will be removed from the online service upon selecting the "Remove Licenses" control 901. FIG. 10 illustrates a removal confirmation window 1000 that may appear should the user select the "Remove Licenses" control 901 of FIG. 9 and confirms removal of the selected users in FIG. 9.

Upon selecting the "Finish" control 1001, the license overview window 1100 will appear. Note that the license overview window 1100 of FIG. 11 is similar to the license overview window 400 of FIG. 4, except now the license conflict of row 411 is no longer appears since the number of user assigned to the online service has now been reduced to 10, which is the number of available licenses.

Thus, an intuitive user interface is provided that allows administrators to quickly resolve license conflicts in a manner that considers the rights of the administrator. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical storage devices having stored thereon computer-executable instructions that are structured such that, when executed by one or more processors of a computing system, cause the computing system to formulate a user interface the computing system, the user interface comprising:
   a license conflict discovery mechanism configured to automatically discover when a license conflict exists for a license, and to discover a plurality of available resolution methods for resolving the license conflict;
   an administrator rights determination mechanism configured to discover a type of an administrative user that is associated with the user interface, and to determine one or more administrator rights of the administrative user of the user interface, the one or more administrator rights affecting which one or more of the plurality of available resolution methods are suitable for the administrative user for resolving the license conflict;
   a resolution method determination mechanism configured to determine the one or more of the plurality of available resolution methods that are suitable for the administrative user based on the one or more administrator rights determined by the administrator rights determination mechanism; and
   a resolution prompt configured to prompt the administrative user of the user interface to resolve the license conflict, wherein the resolution prompt includes only the one or more of the plurality of available resolution methods as determined by the resolution method determination, while excluding one or more other of the plurality of available resolution methods that are not suitable for the administrative user.

2. The computer program product in accordance with claim 1, wherein the license conflict is that the licensee has exceeded the scope of the license.

3. The computer program product in accordance with claim 2, wherein the plurality of methods for resolving the license conflict comprises:
   a license purchase method that may be used to purchase additional users on the license; and
   a user removal method that may be used to remove users off the license.

4. The computer program product in accordance with claim 3, wherein the user interface facilitates the license purchase method using a license purchase interface, and facilitates the user removal method using a user removal interface.

5. The computer program product in accordance with claim 3, wherein there are at least three possible administrator rights, and wherein a first administrator right allows both the license purchase method and the user removal method to be used to resolve the conflict.

6. The computer program product in accordance with claim 5, wherein a second administrator right allows the license purchase method to be used to resolve the conflict, but not the user removal method.

7. The computer program product in accordance with claim 6, wherein a third administrator right allows the user removal method to be used to resolve the conflict, but not the license purchase method.

8. The computer program product in accordance with claim 5, wherein a third administrator right allows the user removal method to be used to resolve the conflict, but not the license purchase method.

9. The computer program product in accordance with claim 1, wherein the license conflict discovery mechanism automatically discovers any one of a plurality of license conflict types.

10. The computer program product in accordance with claim 9, wherein one of the plurality of license conflict types is a license exceeded conflict in which the licensee has exceeded the scope of the license.

11. The computer program product in accordance with claim 10, wherein another of the plurality of license conflict types is a license underutilization conflict in which the licensee has not fully assigned all users available under the license.

12. The computer program product in accordance with claim 11, wherein one of the plurality of resolution methods includes a method for assigning users to the license in order to resolve an underutilization conflict.

13. A computer-implemented method for operating a user interface that interfaces with an administrator, the method comprising:

an act of automatically discovering when a license conflict exists for a license, and discovering a plurality of available resolution methods for resolving the license conflict;

an act of discovering a type of an administrative user that is associated with the user interface, and determining one or more administrator rights of the administrative user of the user interface, the one or more administrator rights affecting which one or more of the plurality of available resolution methods are suitable for the administrative user for resolving the license conflict;

an act of determining the one or more of the plurality of available resolution methods that are suitable for the administrative user based on the one or more administrator rights; and an act of the user interface prompting the administrative user of the user interface to resolve the license conflict, wherein the resolution prompt includes only the one or more of the plurality of available resolution methods as determined by the resolution method determination, while excluding one or more other of the plurality of available resolution methods that are not suitable for the administrative user.

14. The method in accordance with claim 13, wherein the license conflict is that the licensee has exceeded the scope of the license.

15. The method in accordance with claim 14, wherein the plurality of methods for resolving the license conflict comprises:

a license purchase method that may be used to purchase additional users on the license; and a user removal method that may be used to remove users off the license.

16. The method in accordance with claim 15, wherein the user interface facilitates the license purchase method using a license purchase interface, and facilitates the user removal method using a user removal interface.

17. The method in accordance with claim 15, wherein there are at least three possible administrator rights, wherein a first administrator right allows both the license purchase method and the user removal method to be used to resolve the conflict, wherein a second administrator right allows the license purchase method to be used to resolve the conflict, but not the user removal method, and wherein a third administrator right allows the user removal method to be used to resolve the conflict, but not the license purchase method.

18. The method in accordance with claim 13, wherein the license conflict discovery mechanism automatically discovers any one of a plurality of license conflict types.

19. The method in accordance with claim 18, wherein one of the plurality of license conflict types is a license exceeded conflict in which the licensee has exceeded the scope of the license, and wherein another of the plurality of license conflict types is a license underutilization conflict in which the licensee has not fully assigned all users available under the license.

20. A computing system, comprising:

one or more processors; and one or more computer storage media having stored thereon computer-executable instructions that are structured such that, when executed by the one or more processors, cause the computing system to formulate a user interface the computing system, the user interface comprising:

a license conflict discovery mechanism configured to automatically discover when a license conflict exists for a license in that the licensee has exceeded the scope of the license, and to discover a plurality of available resolution methods for resolving the license conflict, the plurality of available resolution methods including at least a license purchase method that may be used to purchase additional users on the license, and a user removal method that may be used to remove users off the license;

an administrator rights determination mechanism configured to discover a type of an administrative user that is associated with the user interface, and to determine one or more administrator rights of the administrative user of the user interface, the one or more administrator rights affecting which one or more of the plurality of available resolution methods are suitable for the administrative user for resolving the license conflict;

a resolution method determination mechanism configured to determine the one or more of the plurality of available resolution methods that are suitable for the administrative user based on the one or more administrator rights determined by the administrator rights determination mechanism, the subset including at least one of the license purchase method and the user removal method; and a resolution prompt configured to prompt the administrative user of the user interface to resolve the license conflict, wherein the resolution prompt includes only the one or more of the plurality of available resolution methods as determined by the resolution method determination, while excluding one or more other of the plurality of available resolution methods that are not suitable for the administrative user.

* * * * *